(12) United States Patent
Shaikh

(10) Patent No.: US 8,596,874 B2
(45) Date of Patent: Dec. 3, 2013

(54) BEARING IN IRREGULAR SHAPED HOUSINGS

(71) Applicant: Shaeffler Technologies AG & Co. KG, Herzogenaurach (DE)

(72) Inventor: Shakeel Shaikh, Windsor (CA)

(73) Assignee: Schaeffler Technologies AG & Co. KG, Herzogenaurach (DE)

(\*) Notice: Subject to any disclaimer, the term of this patent is extended or adjusted under 35 U.S.C. 154(b) by 0 days.

(21) Appl. No.: 13/662,750

(22) Filed: Oct. 29, 2012

(65) Prior Publication Data

US 2013/0108199 A1 May 2, 2013

Related U.S. Application Data

(60) Provisional application No. 61/552,099, filed on Oct. 27, 2011.

(51) Int. Cl.
*F16C 43/00* (2006.01)
*F16C 43/04* (2006.01)

(52) U.S. Cl.
USPC .................................. 384/537; 384/584

(58) Field of Classification Search
USPC .......... 384/428, 439, 535, 581, 537, 584, 585
See application file for complete search history.

(56) References Cited

U.S. PATENT DOCUMENTS

| | | | |
|---|---|---|---|
| 3,512,855 A | 5/1970 | Robinson | |
| 4,248,486 A | 2/1981 | Bradley | |
| D371,138 S * | 6/1996 | Waskiewicz | D15/5 |
| D371,139 S * | 6/1996 | Waskiewicz | D15/5 |
| 7,431,512 B2 * | 10/2008 | Young | 384/535 |
| 7,682,086 B2 * | 3/2010 | Budaker et al. | 384/536 |

\* cited by examiner

*Primary Examiner* — Phillip A Johnson
(74) *Attorney, Agent, or Firm* — Antun M. Peakovic

(57) ABSTRACT

A bearing and housing assembly for irregular shaped housings including a circular extension, retention and distortion relief features that can mitigate shape distortion of bearings.

3 Claims, 3 Drawing Sheets

BEARING IN IRREGULAR SHAPED HOUSINGS

TECHNICAL FIELD

Example aspects described herein relate to bearing and housing assemblies, particularly of bearings in irregular shaped housing designs.

BACKGROUND

Bearing assemblies are typically circular in shape, and generally comprise rolling elements sandwiched between raceways in bearing rings. Rolling elements take many forms, including spherical balls, rollers or various other configurations, such as cone-shaped tapered rollers or barrel-shaped spherical rollers. In order to provide proper anti-friction operation and intended function, including maintaining rolling contact and supporting a specified load, bearings require that some level of concentricity and bearing race circularity be maintained from the outer radial surface of the bearing assembly to the inner radial surface of the bearing assembly. In addition, a clearance equal to or above 0 is typically needed in order that the load zone of the bearing is not spread to the entire circumference of the bearing. Where concentricity and circularity is not maintained, or where there are multiple load zones on a single bearing owing to improper clearance or bearing ring distortion, increased fatigue, noise and vibration, and premature failure of the assembly may result.

In designing a bearing and housing assembly, bearing retention in the housing, bearing clearance, concentricity and, where dissimilar materials are used, operating temperature and variations in coefficients of thermal expansion must be considered. In particular, where the housing is of an irregular shape, such as a triangle or a general non-defined geometry, special attention must be provided to distortion of the typically circular bearing shape. U.S. Pat. No. 3,512,855 "Low Stress Bearing" discloses stress relief features in the bearing outer ring and various concentric assemblies in order to reduce stress in the bearing raceway. A solution to address bearing retention and shape distortion in non-concentric housings is needed.

SUMMARY OF THE INVENTION

A new design for a bearing and housing assembly, in particular, a bearing in an irregular shaped housing is disclosed. In one example embodiment of the invention, the assembly comprises a non-concentric housing, such as a triangular shaped housing, including a circular extension, retention lip and relief feature to prevent distortion of a bearing assembled therein.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner.

Figure 1:
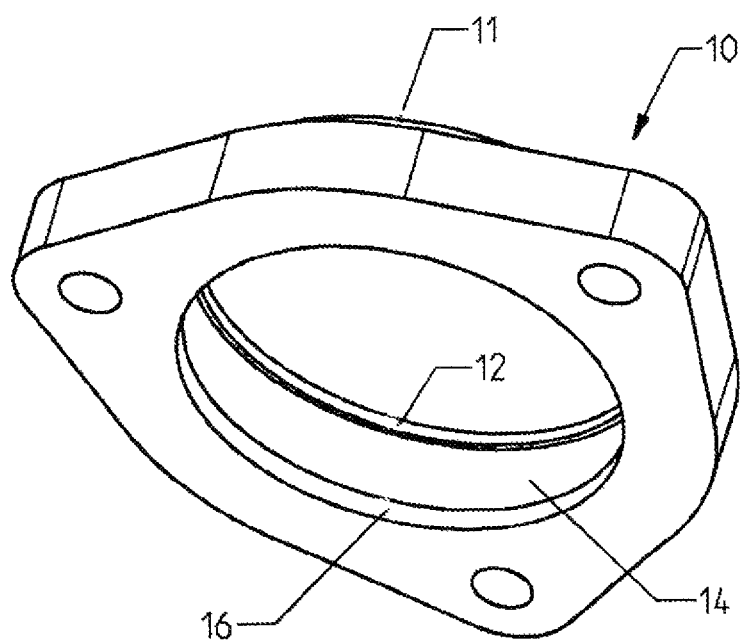
FIG. 1 is a perspective view of a housing according to one example embodiment herein.

FIG. 1 is a perspective view of housing 10 according to one example embodiment of the invention. In this perspective view, housing circular extension 11, retention lip 12, distortion relief feature 14, and end stop 16 are shown. Housing 10 is shown as a triangular structure in this embodiment; however any irregular or non-concentric housing can be used. Circular extension 11 is a circular or round, axially outward extending portion of housing 10, coincident with an outer diameter of a bore extending at least partially through said housing 10. Although extension 11 is shown as integrally formed with housing 10, it is contemplated that extension 11 can be separately formed and later assembled onto or with housing 10.

Figure 2:
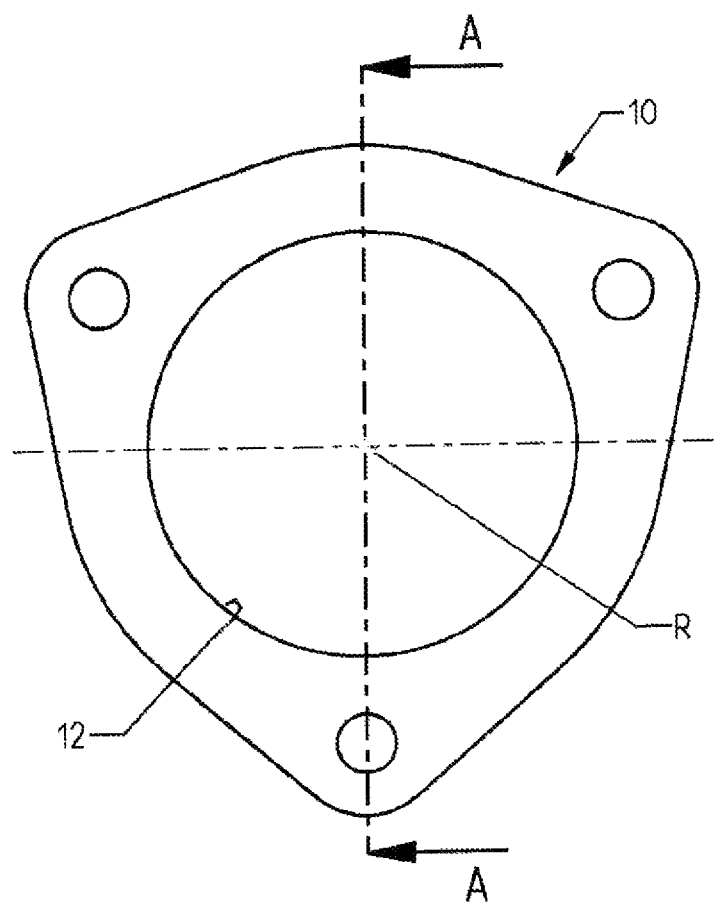
FIG. 2 is a front view of the housing of FIG. 1.
Figure 3:
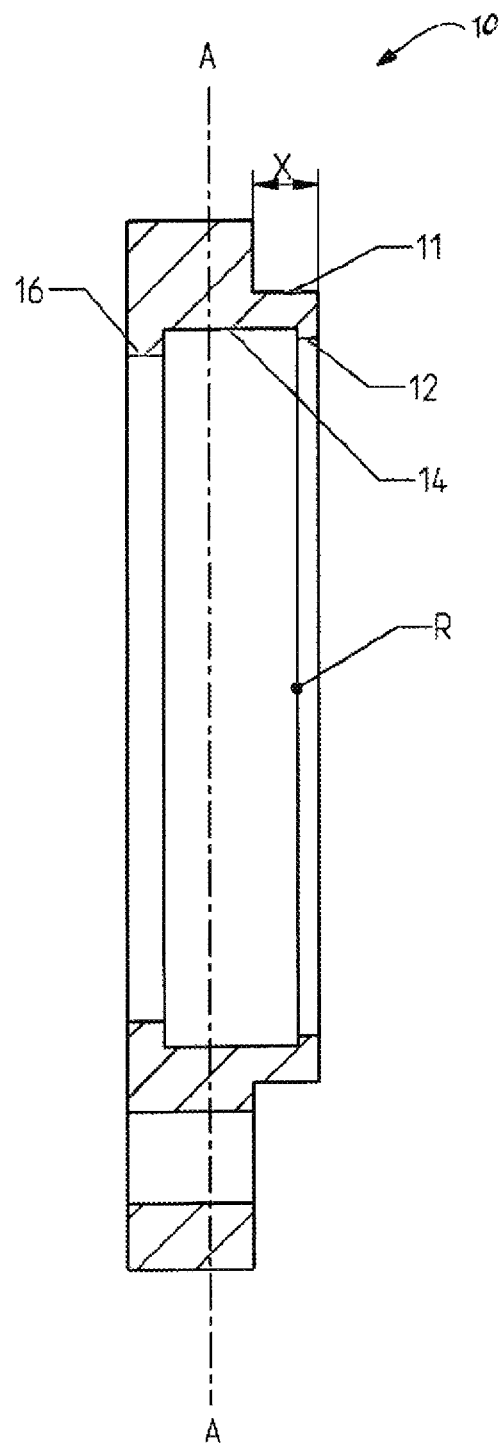
FIG. 3 is a cross sectional view of the housing, taken along line A-A of FIG. 2.
Figure 4:
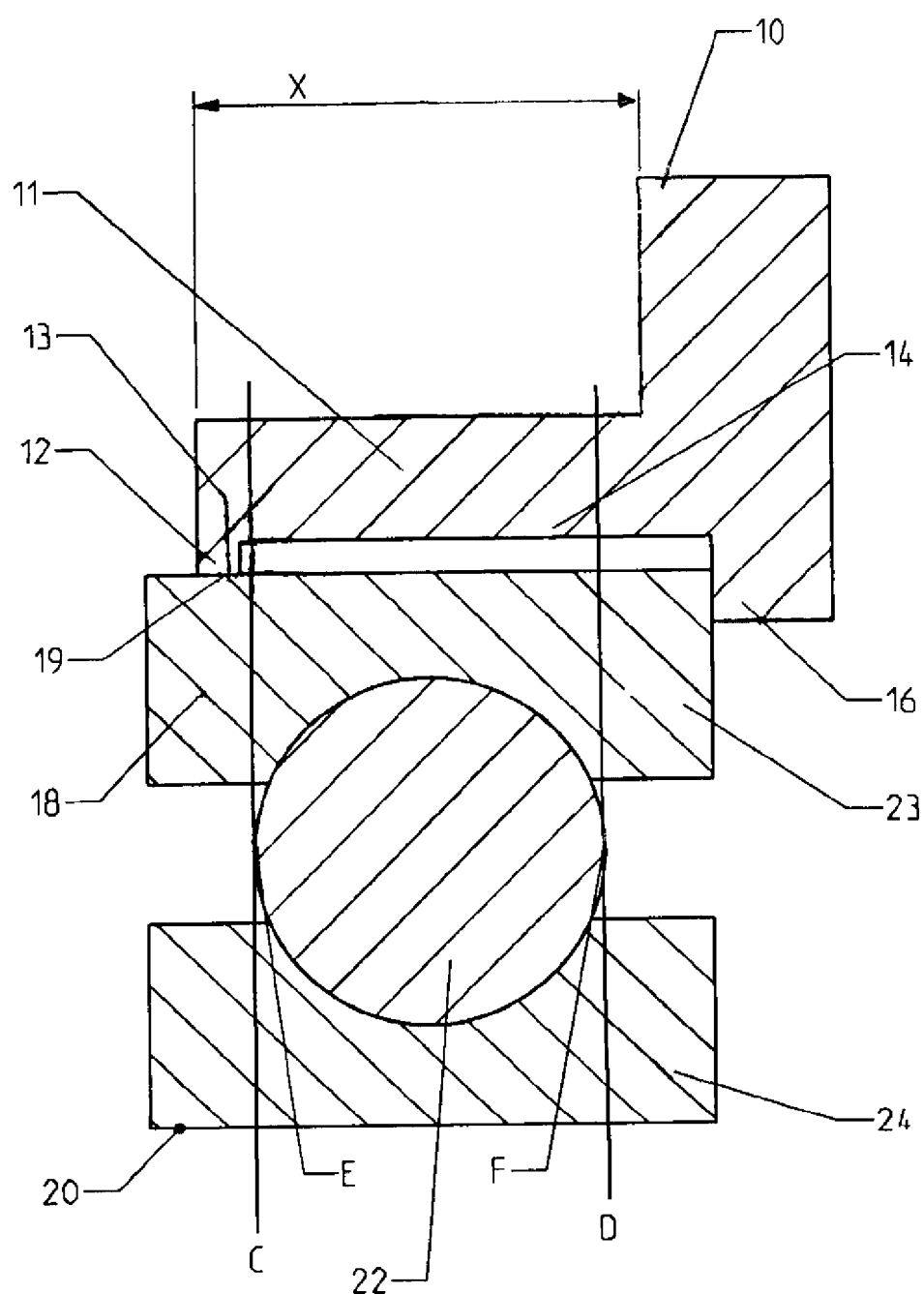
FIG. 4 is a diagrammatic view of a bearing and housing assembly according to one example embodiment herein.

FIG. 2 is a front view of housing 10 of FIG. 1. Retention lip 12 is shown. FIG. 3 is a cross sectional view of housing 10, taken along line A-A of FIG. 2. Retention lip 12 of housing 10 extends towards radial center R of circular extension 11, and as shown in FIG. 4, provides a radial contact surface 13 to contact radial outer surface 19 of a bearing 18 of a bearing and housing assembly. As retention lip 12 extends from circular extension 11, the distortion that can be caused by irregular shaped housing 10 is mitigated or substantially reduced. Circular housing extension 11 can extend from housing 10 a minimal distance X in keeping the circularity of extension 11. By isolating contact surface 19 of bearing 18 from the irregular shape of housing 10, the distorting effect of irregular shaped housing 10 on bearing 18 can be mitigated or substantially reduced. Contact surface 13 and radial outer surface 19 can be designed such that bearing 18 is retained in a bore in housing 10 during transport and assembly into surrounding structures (not shown), (e.g. the surfaces 13 and 19 can be press fit, interlocked or otherwise stably engaged). The level of press fit between radial contact surface 13 of retention lip 12 and radial outer surface 19 of bearing 18 will depend on the specific application needs of any particular system. Radial inner surface 20 of bearing 18 can be pressed onto a shaft or other similar structure (not shown). As further shown in FIG. 4, end stop 16 can be provided in housing 10 in order to provide a press depth surface and axial support for bearing 18 into housing 10. Although shown as a fully extending flange along the entire inner circumference of housing 10, end stop 16 may take various forms, and in other embodiments may extend along only part of that circumference. As further shown, irregular shaped housing 10 has no direct radial contact with bearing 18, the radial contact isolated from irregular shaped housing 10 by circular extension 11 and retention lip 12.

As shown in FIG. 4, retention lip 12 extends toward bearing 18 from circular extension 11, and is designed such that the entire lip lies outside the imaginary vertical plane corresponding to line C and thus outside the running area, defined as the area lying between planes C and D. Vertical planes C and D are, in turn, vertically tangential to opposing end faces at points E and F, respectively, of at least one of rolling elements 22 (only one is shown, but, more than one can be included). Retention lip 12 may also be duplicated on the opposite end of bearing 18 from line C, and would be designed to lie outside the imaginary plane corresponding to line D, although this is not shown for convenience. Conventionally, shape distortion of bearing 18 can have a most significant detrimental impact in the running area, defined as the area lying between planes C and D, of rolling element 22 between outer ring 23 and inner ring 24. However, in accordance with an example aspect of the invention, by extending circular extension 11 axially outward of irregular shaped housing 10, and placing retention lip 12 outside that running area, and including distortion relief feature 14 at least over that running area, the distortion caused by pressing a circular bearing into an irregular shaped housing is mitigated or substantially avoided. In effect, circular extension 11 is isolating bearing 18 from radial contact with irregular shaped housing 10, thus maintaining general circularity of bearing 18 assembled into a bore of housing 10.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

LIST OF REFERENCE SYMBOLS

10 Housing
11 Housing Circular Extension
12 Retention Lip
13 Retention Lip Radial Contact Surface
14 Distortion Relief Feature
16 Housing End Stop
18 Bearing
19 Bearing Radial Outer Surface
20 Bearing Radial Inner Surface
22 Rolling Element
23 Bearing Outer Ring
24 Bearing Inner Ring
C Rolling Element Tangential Plane
D Rolling Element Tangential Plane
E End Face or Point
F End Face or Point
X Circular Extension Length from Housing

What we claim is:

1. A bearing and housing assembly comprising:
    a non-circular housing;
    said housing having a bore extending from one axial end at least partially through said housing;
    a circular extension extending axially outward from said housing coincident with an outer diameter of said bore;
    a bearing;
    said bearing having an outer ring, inner ring and rolling elements disposed therebetween;
    said bearing having a running area axially bounded by planes perpendicular to axial end points of said rolling elements;
    said circular extension having a lip extending radially from an inner radial surface of said circular extension towards the radial center of said housing bore, to a diameter approximately equal to the outer diameter of said bearing outer ring;
    said lip extending axially no further than said running area of said bearing;
    said circular extension having a diameter larger than a diameter of said outer ring of said bearing at least over said running area.

2. The assembly of claim 1, wherein said bore extends through the entire width of said housing.

3. The assembly of claim 2, wherein said housing includes at least one material projection extending radially from an inner radial surface towards the center of said housing bore, axially opposite said lip, to a diameter smaller than the diameter of said bearing outer ring for use as an end stop for said bearing.

* * * * *